US011140537B2

(12) United States Patent
Åkesson et al.

(10) Patent No.: US 11,140,537 B2
(45) Date of Patent: Oct. 5, 2021

(54) PUBLIC INFORMATION SYSTEM

(71) Applicant: Telefonaktiebolaget LM Ericsson (publ), Stockholm (SE)

(72) Inventors: Joakim Åkesson, Landvetter (SE); Sanne Stijve, Villars-sur-Glâne (CH)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/467,134

(22) PCT Filed: Dec. 6, 2016

(86) PCT No.: PCT/EP2016/079881
§ 371 (c)(1),
(2) Date: Jun. 6, 2019

(87) PCT Pub. No.: WO2018/103824
PCT Pub. Date: Jun. 14, 2018

(65) Prior Publication Data
US 2020/0077248 A1    Mar. 5, 2020

(51) Int. Cl.
*H04W 72/04* (2009.01)
*H04W 4/90* (2018.01)
(Continued)

(52) U.S. Cl.
CPC .............. *H04W 4/90* (2018.02); *H04W 4/06* (2013.01); *H04W 48/10* (2013.01); *H04W 76/45* (2018.02); *H04W 84/042* (2013.01)

(58) Field of Classification Search
CPC ......... H04W 4/90; H04W 4/06; H04W 76/45; H04W 48/10; H04W 84/042
See application file for complete search history.

(56) References Cited

U.S. PATENT DOCUMENTS

2005/0202823 A1  9/2005  Shaheen et al.
2006/0005219 A1  1/2006  Owens
(Continued)

FOREIGN PATENT DOCUMENTS

EP    2739077 A1    6/2014
JP    2012147062 A   8/2012
(Continued)

OTHER PUBLICATIONS

Author Unknown, "Technical Specification Group Services and System Aspects; Service accessibility (Release 14)," Technical Specification 22.011, Version 14.3.0, 3GPP Organizational Partners, Jun. 2016, 31 pages.
(Continued)

*Primary Examiner* — Hassan Kizou
*Assistant Examiner* — Mahbubul Bar Chowdhury
(74) *Attorney, Agent, or Firm* — Withrow & Terranova, PLLC

(57) ABSTRACT

A method for a public information system, adapted for broadcasting a message in a first wireless access network. The first wireless access network is arranged to, at least partly, overlap one or more further wireless access networks. The method comprises initiating a modified support announcement by the first wireless access network. The modified support announcement configured to announce support for the further wireless access networks by comprising network identifiers associated with the further wireless access networks, whereby a wireless device associated with a further wireless access network is prompted to connect to the first wireless access network, and initiating broadcasting of the message over the first wireless access network, whereby said wireless device may receive the message over the first wireless access network.

20 Claims, 10 Drawing Sheets

(51) Int. Cl.
*H04W 76/45* (2018.01)
*H04W 4/06* (2009.01)
*H04W 48/10* (2009.01)
*H04W 84/04* (2009.01)

(56) References Cited

U.S. PATENT DOCUMENTS

| | | | |
|---|---|---|---|
| 2007/0161373 A1* | 7/2007 | Klatt | H04W 48/18 |
| | | | 455/434 |
| 2009/0233634 A1 | 9/2009 | Aghili et al. | |
| 2013/0208644 A1 | 8/2013 | Jung et al. | |
| 2014/0128029 A1 | 5/2014 | Fong et al. | |
| 2014/0226533 A1 | 8/2014 | Bates et al. | |
| 2015/0004924 A1* | 1/2015 | Kim | H04W 4/90 |
| | | | 455/404.1 |
| 2015/0172965 A1 | 6/2015 | Jeong et al. | |
| 2015/0173115 A1 | 6/2015 | Van Phan et al. | |
| 2016/0007138 A1* | 1/2016 | Palanisamy | H04L 67/1044 |
| | | | 455/41.2 |
| 2016/0050038 A1 | 2/2016 | Daly et al. | |
| 2016/0127439 A1 | 5/2016 | Ginnela et al. | |
| 2016/0183179 A1* | 6/2016 | Fan | H04W 48/12 |
| | | | 455/434 |
| 2016/0219614 A1* | 7/2016 | Webb | H04W 72/0446 |
| 2017/0230818 A1* | 8/2017 | Park | H04W 8/02 |

FOREIGN PATENT DOCUMENTS

| | | |
|---|---|---|
| JP | 2016051268 A | 4/2016 |
| JP | 2017200049 A | 11/2017 |
| WO | 2014091596 A1 | 6/2014 |
| WO | 2015000134 A1 | 1/2015 |
| WO | 2015010267 A1 | 1/2015 |
| WO | 2016004600 A1 | 1/2016 |
| WO | 2016162467 A1 | 10/2016 |

OTHER PUBLICATIONS

Author Unknown, "Technical Specification Group Core Network and Terminals; Technical realization of Cell Broadcast Service (CBS) (Release 13)," Technical Specification 23.041, Version 13.2.0, 3GPP Organizational Partners, Dec. 2015, 69 pages.

Author Unknown, "Technical Specification Group Core Network and Terminals; Technical realization of Cell Broadcast Service (CBS) (Release 13)," Technical Specification 23.041, Version 14.0.0, 3GPP Organizational Partners, Sep. 2016, 71 pages.

Author Unknown, "Technical Specification Group Services and System Aspects; Network Sharing; Architecture and functional description (Release 13)," Technical Specification 23.251, Version 13.2.0, 3GPP Organizational Partners, Jun. 2016, 39 pages.

Author Unknown, "Technical Specification Group Radio Access Network; Radio Resource Control (RRC); Protocol Specification (Release 14)," Technical Specification 25.331, Version 14.0.0, 3GPP Organizational Partners, Sep. 2016, 2276 pages.

Author Unknown, "Technical Specification Group Radio Access Network; Evolved Universal Terrestrial Radio Access (E-UTRA); Radio Resource Control (RRC); Protocol specification (Release 14)," Technical Specification 36.331, Version 14.0.0, 3GPP Organizational Partners, Sep. 2016, 644 pages.

Author Unknown, "Technical Specification Group Radio Access Network; Evolved Universal Terrestrial Radio Access Network (E-UTRAN); S1 Application Protocol (S1AP) (Release 14)," Technical Specification 36.413, Version 14.0.0, 3GPP Organizational Partners, Sep. 2016, 333 pages.

Author Unknown, "Technical Specification Group Radio Access Network; Mobile radio interface layer 3 specification; GSM/EDGE Radio Resource Control (RRC) protocol (Release 13)," Technical Specification 44.018, Version 13.3.2, 3GPP Organizational Partners, Sep. 2016, 533 pages.

International Search Report and Written Opinion for International Patent Application No. PCT/EP2016/079881, dated Mar. 23, 2017, 10 pages.

International Preliminary Report on Patentability for International Patent Application No. PCT/EP2016/079881, dated Nov. 14, 2018, 17 pages.

Office Action for Taiwanese Application No. 201822478, dated Jul. 30, 2018, 39 pages.

SA2, "TD SP-120207: LS on handovers in FULL-MOCN-GERAN," 3GPP TSG SA Meeting #56, Jun. 18-20, 2012, 2 pages, Ljubljana, Slovenia.

Examination Report for Colombian Patent Application No. NC2019/0005054, dated Jun. 18, 2020, 4 pages.

Notice of Reasons for Refusal for Japanese Patent Application No. 2019-527362, dated Aug. 21, 2020, 4 pages.

Decision to Grant for Japanese Patent Application No. 2019-527362, dated Jan. 15, 2021, 6 pages.

Extended European Search Report for European Patent Application No. 20194666.2, dated Nov. 19, 2020, 9 pages.

Notification of Reason for Refusal for Korean Patent Application No. 10-2019-7018323, dated Mar. 20, 2020, 14 pages.

Grant of Patent for Korean Patent Application No. 10-2019-7018323, dated Aug. 25, 2020, 3 pages.

* cited by examiner

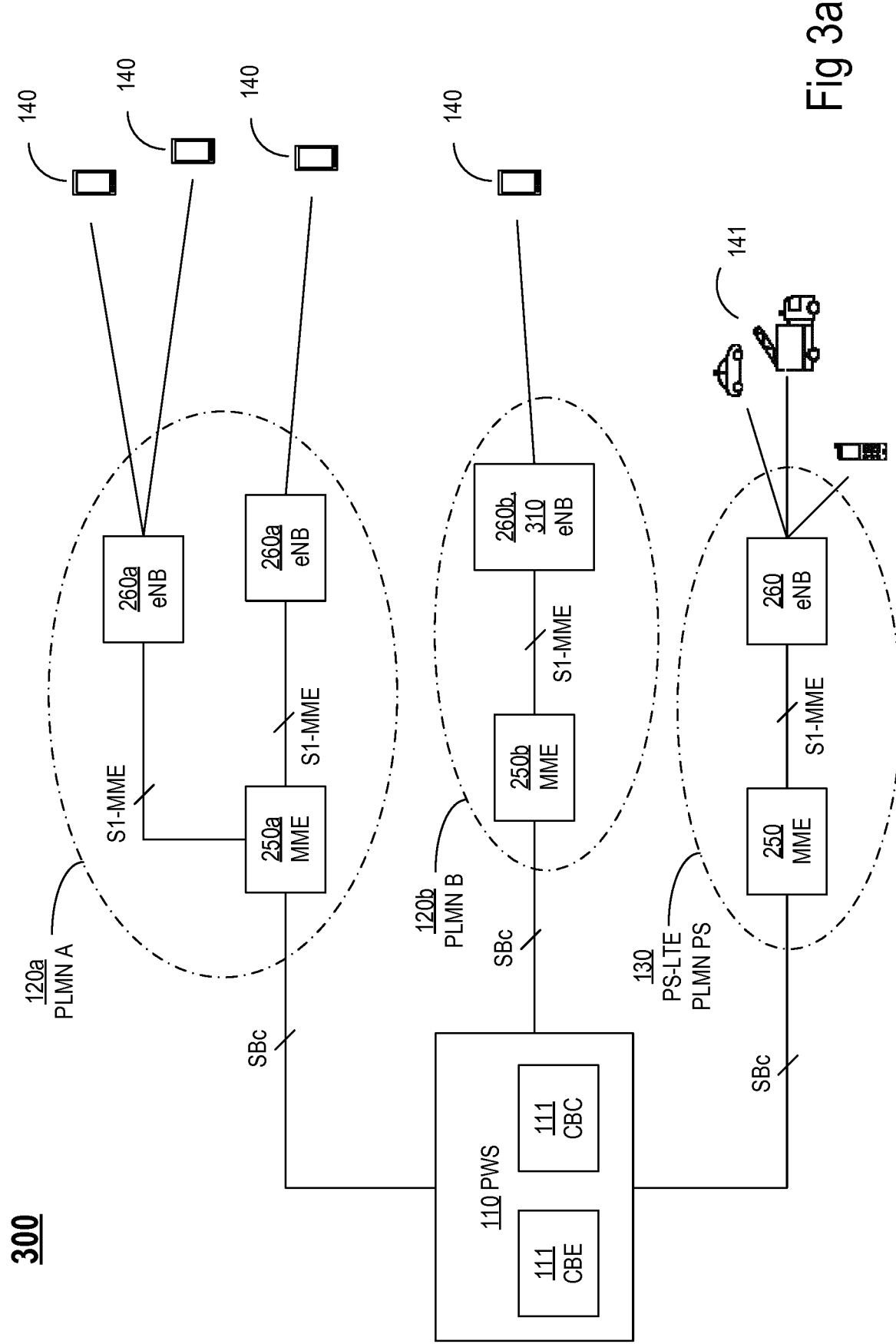

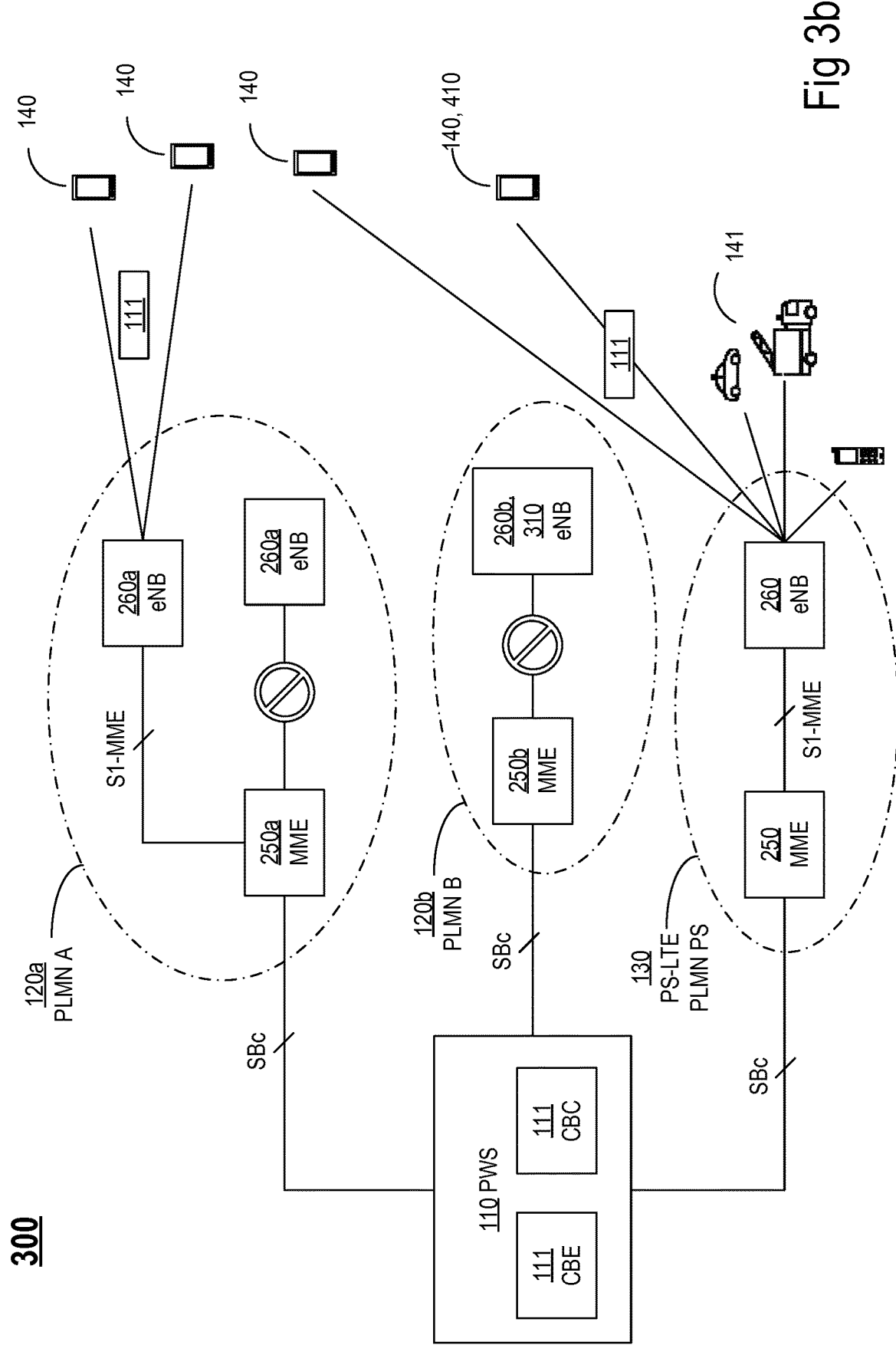

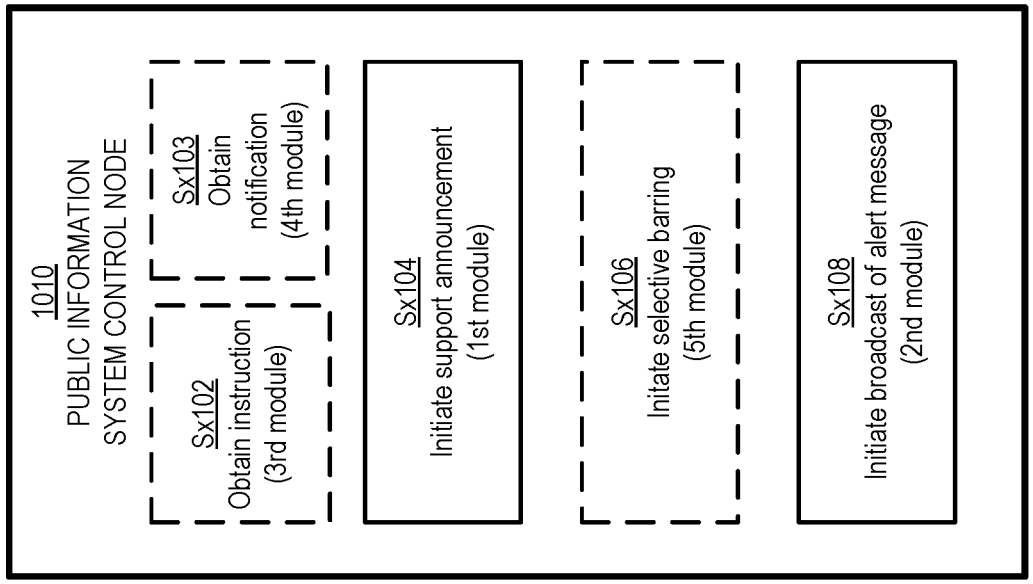
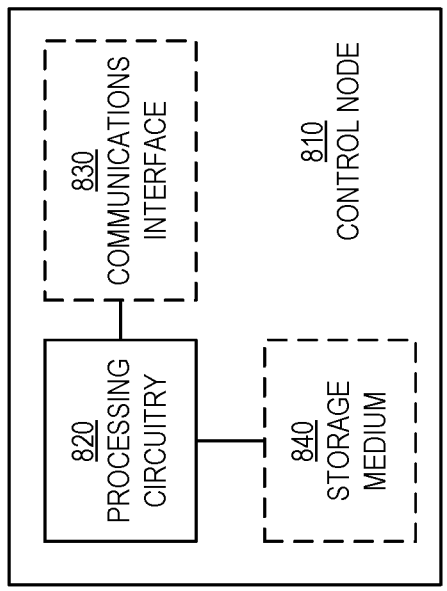
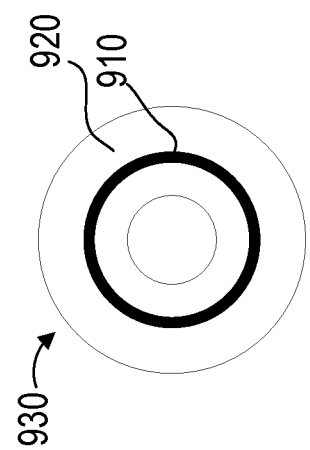
Fig. 10
Fig 8
Fig 9

```
SystemInformationBlockType1::=      SEQUENCE {
    cellAccessRelatedInfo           SEQUENCE {
        plmn-IdentityList               PLMN-IdentityList,
        trackingAreaCode                TrackingAreaCode,
        cellIdentity                    CellIdentity,
        cellBarred                      ENUMERATED {barred, notBarred},
        intraFreqReselection             ENUMERATED {allowed, notAllowed},
        csg-Indication                  BOOLEAN,
        csg-Identity                    CSG-Identity     OPTIONAL -- Need OR
    },
    cellSelectionInfo               SEQUENCE {
        q-RxLevMin                      Q-RxLevMin,
        q-RxLevMinOffset                INTEGER (1..8)   OPTIONAL -- Need OP
    },
    p-Max                           P-Max                OPTIONAL -- Need OP
    freqBandIndicator               FreqBandIndicator,
    schedulingInfoList              SchedulingInfoList,
    tdd-Config                      TDD-Config           OPTIONAL -- Cond TDD
    si-WindowLength                 ENUMERATED {
                                        ms1, ms2, ms5, ms10, ms15, ms20,
                                        ms40},
    systemInfoValueTag              INTEGER (0..31),
    nonCriticalExtension            SystemInformationBlockType1-v890-IEs OPTIONAL
}

PLMN-IdentityList ::=    SEQUENCE (SIZE (1..maxPLMN-r11)) OF PLMN-IdentityInfo

PLMN-IdentityInfo ::=    SEQUENCE {
    plmn-Identity                   PLMN-Identity,
    cellReservedForOperatorUse       ENUMERATED {reserved, notReserved}
}
```

Fig 11

PUBLIC INFORMATION SYSTEM

This application is a 35 U.S.C. § 371 national phase filing of International Application No. PCT/EP2016/079881, filed Dec. 6, 2016, the disclosure of which is incorporated herein by reference in its entirety.

TECHNICAL FIELD

Embodiments presented herein relate to wireless access networks, and more specifically to methods, control nodes, computer programs, and a computer program product for public information and public warning systems.

BACKGROUND

Wireless public information systems, where information is broadcasted wirelessly to the public from a central source, such as a government organization, have been around for a long time. The broadcasted data can be for information purposes, e.g., to inform the public about construction work affecting availability of utilities such as electrical power, or for warning purposes, e.g., to inform the public about the current state of an ongoing wildfire. An important property in a public information system is the ability to reliably reach as many members of the public as possible.

Traditionally, broadcasting of information or warning messages to the public has been done over television and public radio media. For instance, US20060005219 discloses a standby television warning system for public warning. This warning system improves on the delivery reliability of public warning messages in that a television can receive the broadcast even when in standby mode.

The public are shifting away from traditional broadcast media. Television is now mainly distributed via cable or the Internet, and radio media is often received as internet radio. To improve further on the coverage and reliability of public information systems, mobile access networks can be used to broadcast data to the public. For instance, US20090233634 discloses a public warning system for mobile devices. This type of public information system based on wireless access networks advantageously reaches the part of the public that do not have access to traditional broadcasting systems like television and public radio.

However, wireless access networks such as the second (2G), third (3G), fourth (4G), or fifth (5G) generation mobile access networks may not always be robust in the face of, e.g., natural disasters, or may not always have sufficient radio coverage to reach all members of the public.

SUMMARY

An object of embodiments herein is to improve on systems for transmitting information to the public and to provide a more robust public information system with improved resilience and robustness.

According to a first aspect, there is disclosed a method for a public information system, adapted for broadcasting a message in a first wireless access network. The first wireless access network is arranged to, at least partly, overlap one or more further wireless access networks. The method comprises initiating a modified support announcement by the first wireless access network. The modified support announcement is configured to announce support for the further wireless access networks by comprising network identifiers associated with the further wireless access networks, whereby a wireless device associated with a further wireless access network is prompted to connect to the first wireless access network. The method also comprises initiating broadcasting of the message over the first wireless access network, whereby said wireless device may receive the message over the first wireless access network.

Thus, advantageously, wireless devices who are not listening to transmissions from the first wireless access network normally is prompted to connect to the first wireless access network, thinking that they are connecting to the further wireless access network with which they are associated. This way the public information system may reach wireless devices that are not normally associated with the first wireless access network via the first wireless access network.

Advantageously, since the first wireless access network may be implemented in a more robust and resilient manner than the one or more further wireless access networks, robustness of the public information system is improved.

Advantageously, the disclosed public information system may reach an increased percentage of the public, including members of the public that do not have access to traditional broadcasting media such as television or public radio.

According to aspects, the method comprises obtaining an instruction to initiate broadcast of the message to wireless devices associated with one or more of the further wireless access networks.

Thus, there is provided a means for control and initiation of the public information broadcasting.

According to aspects, the obtaining an instruction comprises obtaining network identifiers corresponding to the further wireless access networks. This way the public information system can identify relevant further wireless access networks and broadcast messages to wireless devices in need of information which are associated with said further wireless access networks.

According to aspects, the method comprises obtaining a notification of a malfunction condition in one or more of the further wireless access networks. This way the public information system becomes aware of malfunctioning further wireless access networks, and can initiate broadcasting to wireless devices associated with such malfunctioning wireless access networks.

According to aspects, the method comprises initiating selective barring of a wireless device associated with a further wireless access network from accessing the first wireless access network. A barred wireless device is prevented from using communications resources of the first wireless access network. Thus, overloading the first wireless access network by requests for service from the wireless devices associated with the one or more further wireless access networks is prevented. Advantageously, the barring is selective, meaning that certain wireless devices are barred and others not. This way a given wireless device may be allowed access to the first wireless access network, even though having no subscription to this network, while most wireless devices associated with the one or more further wireless access networks are barred in order to prevent overloading the first wireless access network.

According to aspects, the method comprises initiating broadcast of a notification message comprising information about said modified support announcement to wireless devices associated with the further wireless access networks.

This way users of the wireless devices that have received the modified support announcement and have connected to the first wireless access network is notified of the fact, and can also be made aware of certain changes in, e.g., service level obtained from the first wireless access network compared to the further wireless access network.

According to aspects, the initiating broadcasting comprises selectively initiating broadcasting in a part of the first wireless access network, whereby the message is broadcasted in the part of the first wireless access network, and is not broadcasted in another part of the first wireless access network.

Thus, broadcasting can be limited to a certain geographical area where the broadcasted message is relevant. Thus, communications resources of the first wireless access network are conserved, and the relevance of messages to recipients in a given geographical area can be ensured.

According to aspects, the initiating a modified support announcement comprises initiating broadcasting of a modified support announcement selectively in a part of the first wireless access network, whereby the modified support announcement is broadcasted in the part of the first wireless access network, and is not broadcasted in another part of the first wireless access network. Thus, modified support announcement is selectively transmitted to wireless devices located in a certain geographical area. This way only relevant wireless devices are prompted to connect to the first wireless access network, e.g., wireless devices that are in the geographical area to which the broadcasted message pertains.

There is also disclosed herein a public information system control node arranged to control a public information system adapted for broadcasting a message in a first wireless access network. The first wireless access network is arranged to, at least partly, overlap one or more further wireless access networks. The control node comprises processing circuitry. The processing circuitry is configured to cause the control node to initiate a modified support announcement by the first wireless access network. This modified support announcement is configured to announce support for the further wireless access networks by comprising network identifiers associated with the further wireless access networks, whereby a wireless device associated with a further wireless access network is prompted to connect to the first wireless access network, and to initiate broadcasting of the message over the first wireless access network, whereby said wireless device may receive the message over the first wireless access network.

There is furthermore disclosed a computer program for a control node arranged to control a public information system adapted for broadcasting a message in a first wireless access network. The first wireless access network is arranged to, at least partly, overlap one or more further wireless access networks. The computer program comprises computer code which, when run on processing circuitry of the control node, causes the control node to initiate a modified support announcement by the first wireless access network. The modified support announcement is configured to announce support for the further wireless access networks by comprising network identifiers associated with the further wireless access networks, whereby a wireless device associated with a further wireless access network is prompted to connect to the first wireless access network, and to initiate broadcasting of the message over the first wireless access network, whereby said wireless device may receive the message over the first wireless access network.

It is to be noted that any feature of the above discussed aspects may be applied to any other aspect, wherever appropriate. Likewise, any advantage of the first aspect may equally apply to the other aspects and vice versa. Other objectives, features and advantages of the enclosed embodiments will be apparent from the following detailed disclosure, from the attached dependent claims as well as from the drawings.

Generally, all terms used in the claims are to be interpreted per their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 3a, 3b illustrate an example sequence of events involving Long Term Evolution (LTE) wireless access networks according to embodiments;

FIG. 8 is a schematic diagram showing functional units of a control node according to embodiments;

FIG. 9 schematically illustrates a computer program and a computer program product;

FIG. 10 is a schematic diagram showing modules of a control node according to embodiments;

FIG. 11 illustrates a SystemInformationBlockType1 message format;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
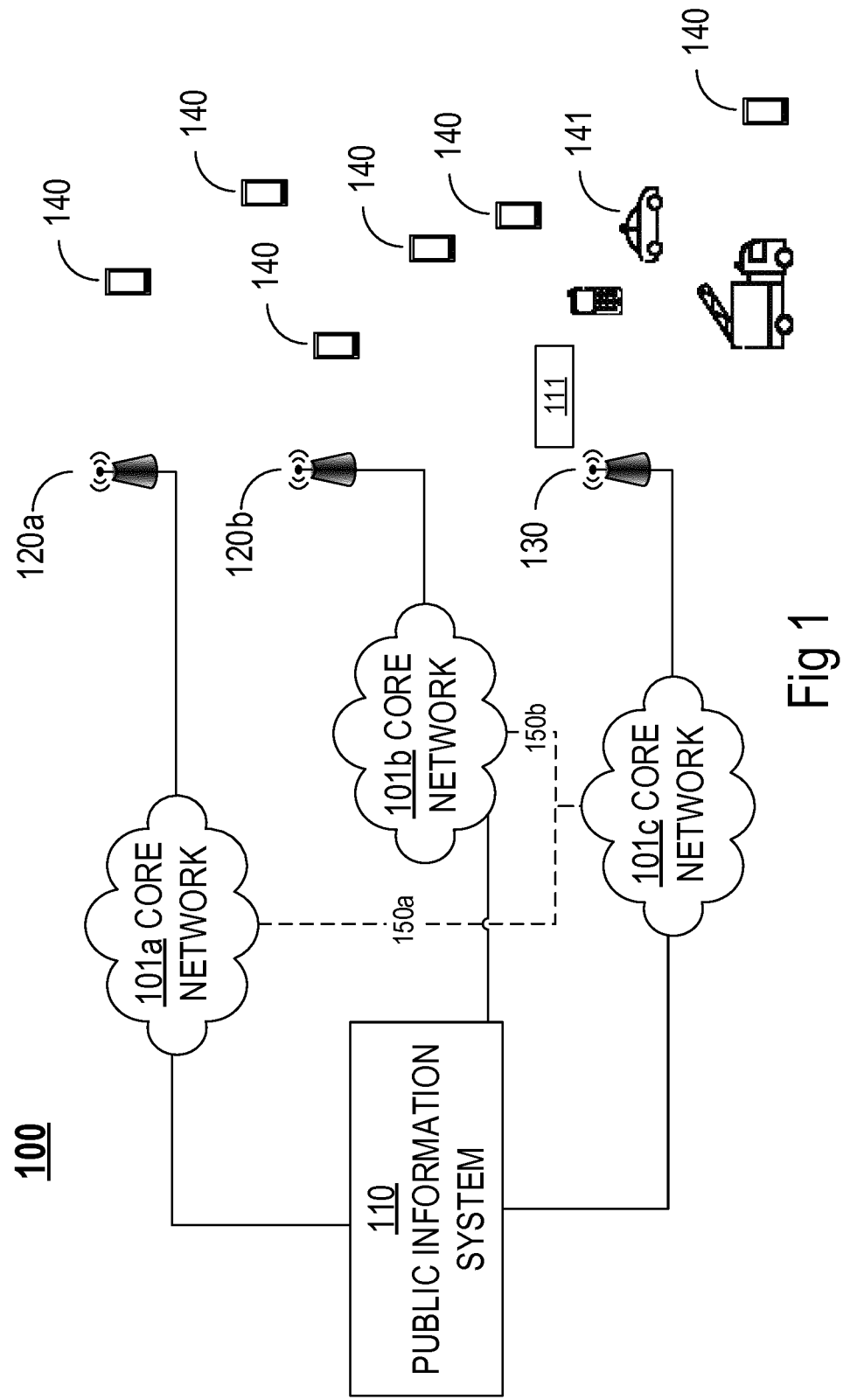
FIG. 1 is a schematic diagram illustrating a communications system according to embodiments.

FIG. 1 is a schematic diagram illustrating a communications system 100 where embodiments presented herein can be applied. The communications system 100 is assumed to provide a public information service to wireless devices 140, 141, by a public information system 110. Message 111 illustrates the broadcast of information to wireless devices. The public information system is, according to aspects, a public warning system, in which case the message 111 comprises a warning or alert message.

It is appreciated that the information, warning, or alert message 111 can be delivered in different formats depending on circumstances and network implementation. For instance, according to various aspects, the message 111 comprises any of a text message, a voice message, a Short Message Service (SMS), a tactile warning signal, or a general purpose input signal to the wireless device, which general purpose input signal can be used to trigger, e.g., a horn or warning light operatively connected to the wireless device.

It is furthermore appreciated that only a subset of message formats is supported in the embodiments discussed in connection to FIGS. 5-7.

The communications system 100 comprises a plurality of wireless access networks 120a, 120b, 130. Each wireless access network is illustrated by a single radio transceiver in FIG. 1, but it is appreciated that, in general, a wireless access network comprises a plurality of radio transceivers, or radio base stations.

Core networks 101a, 101b, 101c are operatively connected to respective wireless access networks. The public information system 110 is shown in FIG. 1 to be operatively connected to the wireless access networks via the core networks. However, according to some aspects the public information system 110 can also be operatively connected directly to the wireless access networks.

A wireless device is associated with one or more of the wireless access networks. This means that the wireless device may connect to the wireless access network and use communications resources of the wireless access network.

Examples of wireless devices 140, 141 include, but are not limited to, mobile stations, mobile phones, handsets, wireless local loop phones, user equipment (UE), smartphones, laptop computers, and tablet computers. Examples of wireless access network nodes include, but are not limited to, radio base stations, base transceiver stations, node Bs, evolved node Bs, and access points. The herein disclosed embodiments are not limited to any particular number of wireless access networks or wireless devices.

Figure 2A:
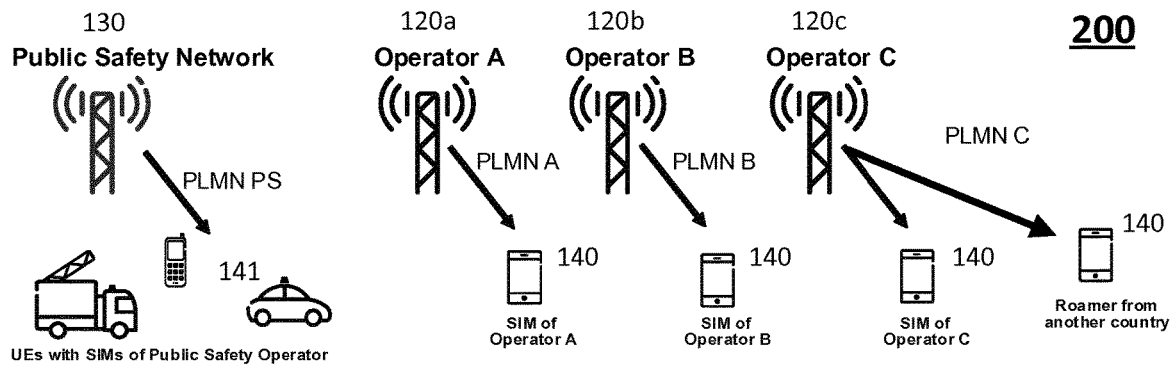
FIGS. 2a, 2b, 2c illustrate an example sequence of events involving various wireless access networks according to embodiments.
Figure 2B:
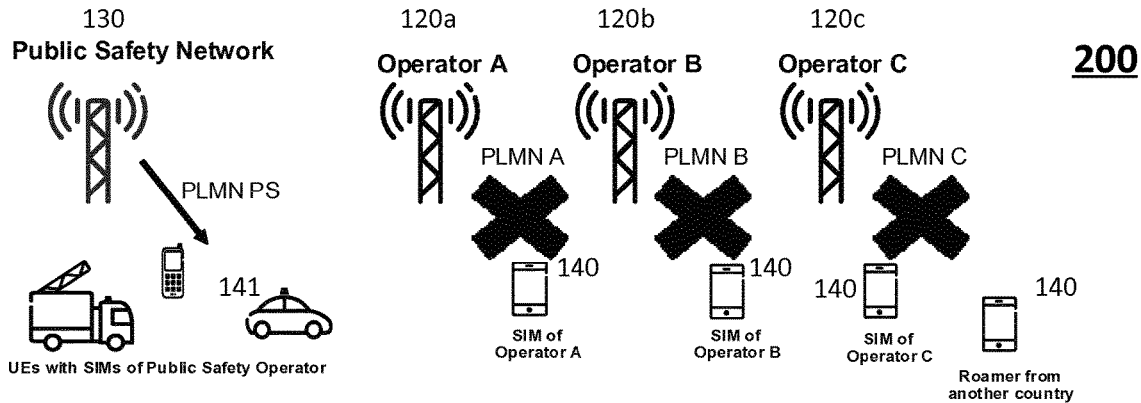
Figure 2C:
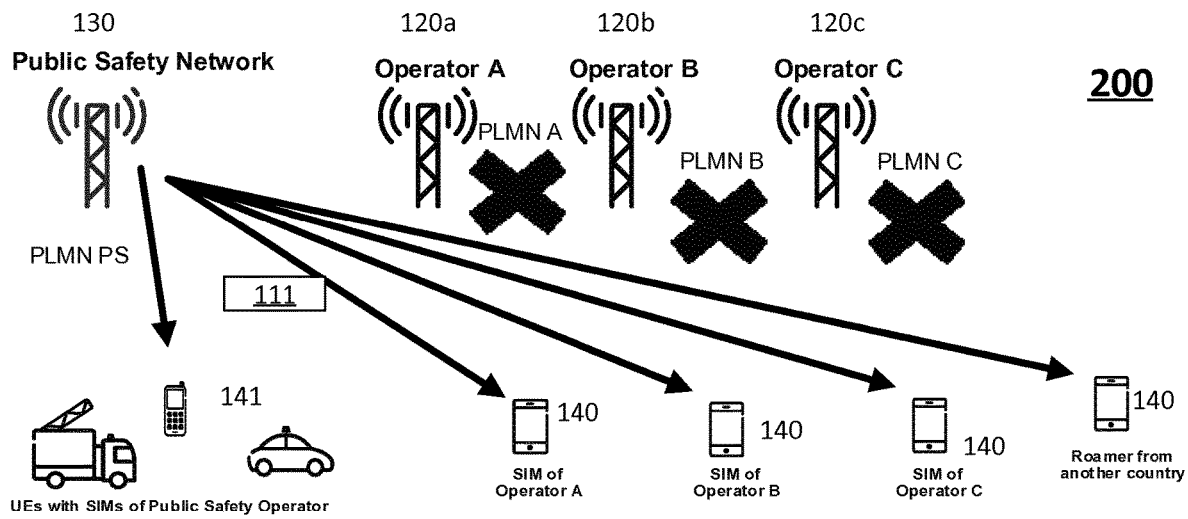

FIGS. 2a-2c illustrate a communication system 200. FIGS. 2a-2c show a first wireless access network 130, here illustrated as a Public Safety (PS) network. The PS network is part of a Public Land Mobile Network (PLMN) for Public Safety, here shown as a PLMN PS network. Normally, wireless devices 141 associated with various public services such as police, medical emergency services, and fire brigade, use the PS network for communications purposes.

There are also shown three further wireless access networks 120a, 120b, 120c. These are PLMNs operated by Mobile Network Operators (MNOs) Operator A, Operator B, and Operator C, respectively. Of course, one MNO may operate one or more wireless access networks. These networks serve wireless devices associated with the respective networks. Here, 'associated with' can mean, e.g., that the different wireless devices have Subscriber Identity Modules (SIMs) associated with the different operators. Herein, in general, 'associated with' can also mean that the wireless devices are in possession of an access code or other identification means allowing access to the different networks.

The first wireless access network is arranged to at least partly overlap one or more of the further wireless access networks. This means that one or more of the wireless devices connected to a further wireless access network is in radio range also of the first wireless access network. It is appreciated that the overlap relates to at least partly overlapping radio coverage areas between the first wireless access network and the one or more further wireless access networks.

In FIG. 2a operation is normal. The wireless devices 140, 141 are connected to the wireless access networks with which they are associated, shown by black arrows. Note also the roamer from another country on the far right. This wireless device is indirectly associated with Operator C according, e.g., to a roaming agreement between operator C and the operator with which the wireless device is normally associated.

In FIG. 2b an event has occurred which prevents wireless devices from accessing the wireless access networks 120a, 120b, 120c. For instance, an earthquake or wildfire may have occurred, or a severe power outage. These events may prevent the radio access nodes and/or backhaul networks from operating properly, which causes outage. In particular, alert or warning messages may no longer be broadcasted over PLMN A, B, or C to wireless devices 140.

However, the PS network is still operational, since this type of network is usually implemented in a more robust and resilient manner than the normal commercial Mobile Network Operator (MNO) networks. For instance, a PS network is likely to comprise some measure of component redundancy in terms of, e.g., redundant radio base stations, a more advanced back-up power source, and possibly also redundancy in terms of radio base station coverage. So, while all three PLMNs A, B, and C are down, the PLMN PS is still up and running and is providing service to connected wireless devices 141.

In FIG. 2c, the PS network first broadcasts a modified support announcement which reaches the wireless devices associated with PLMN A, B, and C. This modified support announcement advertises support not only for PLMN PS, but also for PLMN A, PLMN B, and PLMN C. Since there is at least partial overlap between the different further wireless access networks and the first wireless access network, some or all of the wireless devices 140 associated with these PLMNs will hear the modified support announcement from PLMN PS. They are thus prompted to connect to a cell belonging to PLMN PS even though they are not associated with PLMN PS, i.e., the SIM is not a SIM for PLMN PS, but for one of PLMN A, B, or C. Once connected to PLMN PS, wireless devices may receive an information message that is broadcasted over PLMN PS.

Thus, advantageously, wireless devices who are not listening to transmissions from PLMN PS in normal operation are prompted to connect to the PS network, thinking that they are connecting to the wireless access network which they are associated with, i.e., PLMN A, B, or C. This way a public information system may reach wireless devices that are not normally associated with the first wireless access network via the first wireless access network. Thus the coverage of the public information system is improved.

According to one aspect, there is a connection, illustrated by dashed lines 150a and 150b in FIG. 1, from the PS network, or from the PS core network, to the core network of one or more further wireless access networks. This way a public information system may reach wireless devices that are not normally associated with the first wireless access network via the first wireless access network, and wireless devices that have been prompted to connect to the PS network may reach their respective PLMNs via RAN sharing.

It is appreciated that FIGS. 1 and 2 illustrate wireless access networks in general, not necessarily associated with any specific telecommunications standard. The disclosed concept is applicable in any type of network which provides a modified support announcement functionality, and a broadcasting mechanism. Examples of where the disclosed technique is applicable comprise, e.g., Global System for Mobile communications (GSM) networks, Universal Mobile Telecommunications Service (UMTS), CDMA2000, WiMAX, Long Term Evolution (LTE), fifth generation (5G) wireless access networks, and the various 802.11 wireless local area network (WLAN) protocols.

It is appreciated that embodiments comprising an 802.11 wireless local area network (WLAN) protocol advertise support, i.e., broadcast support announcements, using one or more service set identifiers (SSID). This way, a function similar to announcing support for multiple PLMN in RAN sharing is obtained.

FIGS. 3a, 3b illustrate a communication system 300. FIGS. 3a and 3b illustrate an example sequence of events in a public information system according to embodiments. In this example the first and further wireless access networks 120a, 120b, 130 are LTE networks. The networks are operatively connected to a public warning system (PWS) 110, which comprises a Cell Broadcast Entity (CBE), and a Cell Broadcast Center (CBC). The PWS, CBE, and CBC are further discussed in Third Generation Partnership Project (3GPP) texts TS 23.041 version 14.0.0. The PWS 110 is operatively connected at least partly via interface SBc to respective Mobility Management Entities (MME) 250 of each network. The MMEs are then operatively connected at least partly to eNodeBs 260 via interface S1-MME. The eNodeBs are servicing wireless devices 140, 141.

When PLMN A 120a and PLMN B 120b are operational, they broadcast support announcements prompting wireless devices associated with the respective PLMNs to attach to the respective networks. In this case the PWS 110 may broadcast messages to wireless devices over the different PLMNs in parallel, i.e., over PLMN A, PLMN B and over the PS-LTE to the different wireless devices in the area.

In FIG. 3b, an event has occurred which is preventing some eNodeBs to service wireless devices. This can for instance be due to a power outage at the eNodeB, or due to a loss or malfunction in the backhaul interface S1-MME. Consequently, some wireless devices cannot be reached from the PWS via the original eNodeB. For instance, wireless device 410 that was previously served from eNodeB 310 can no longer be reached from that radio base station 310. Thus, any information or alert messages broadcasted via PLMN B will not reach all intended recipients.

In order to improve on the probability of delivery of broadcasted messages, the PS-LTE network first broadcasts a modified support announcement. This support announcement is a modified support announcement that comprises not only the identifier of the PS-LTE network, but also comprises the identifier of one or more of the further wireless networks PLMN A and PLMN B.

With respect to an LTE-based wireless access network, the modified support announcement is comprised in the SystemInformationBlockType1 message, which is defined in Sec. 6.2.2 "Message definitions", of the 3GPP text TS 36.331 v14.0.0, and copied in below. Parts relevant to the discussed wireless network identifiers are indicated by bold and underlined text in FIG. 11.

Thus, according to some aspects, a network identity or network identifier comprises a PLMN identity, PLMN ID, or PLMN-IdentityInfo.

To configure the modified support announcement in an LTE-based wireless access network, the plmn-IdentityList field is modified to comprise the PLMN-Identity of the further wireless access networks, i.e., PLMN A and PLMN B in this example.

It is appreciated that similar support announcements, having the function of announcing support to wireless devices, are present in other wireless access network standards, like 3GPP 2G and 3G systems.

With respect to a 2G GERAN-based wireless access network, the modified support announcement is comprised in the System Information Type 22 message, which is defined in Sec. 10.5.2.37n "SI 22 rest octets", of the 3GPP text TS 44.018 v13.3.2.

With respect to a 3G UTRAN-based wireless access network, the modified support announcement is comprised in the MasterinformationBlock message, which is defined in Sec. 11.3 "Information element definitions", of the 3GPP text TS 25.331 v14.0.0

As mentioned above, the first wireless access network can also be an 802.11 WLAN family network. WLAN network broadcast support announcements using protocol service set identifiers (SSID). Thus, according to some further aspects, a network identity or network identifier comprises an 802.11 wireless local area network (WLAN) protocol SSID.

3GPP TS 23.251, v13.2.0, Section 4.2.2 "Broadcast system information for network sharing" states that: If a shared Radio Access Network (RAN) is configured to indicate available core network operators for selection by UEs, each cell in shared radio access network shall in the broadcast system information include information concerning available core network operators in the shared network.

The available core network operators shall be the same for all cells of a Location Area in a shared UTRAN or GERAN network. The available core network operators shall be the same for all cells of a Tracking Area in a shared E UTRAN network. A supporting UE decodes the broadcast system information and takes the information concerning available core network operators into account in network and cell (re-)selection procedures."

Thus, when a User Equipment (UE), or wireless device, such as wireless device 410, receives said modified support announcement it is prompted to connect to the wireless access network that made the support announcement, in this case the PS-LTE wireless access network 130. Once the wireless device connects to the PS-LTE network, it can start to receive broadcasts and other system information messages transmitted on this network.

Thus, a broadcasted information message 111 reaches the wireless device 410 even though this wireless device has no direct association to, or even knowledge of, the PS-LTE network 130.

Figure 4:
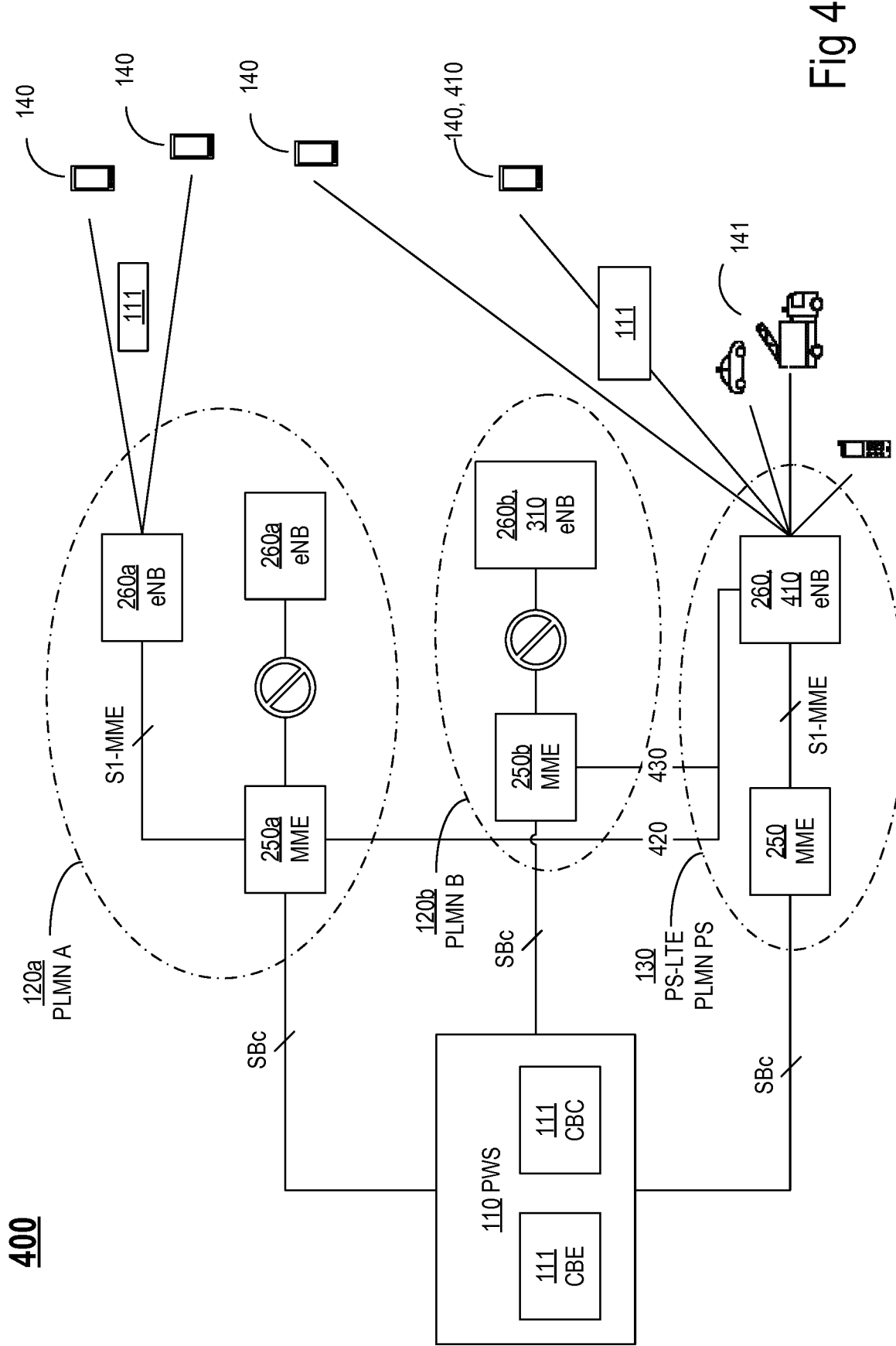
FIG. 4 illustrates an example LTE wireless access network according to embodiments.

FIG. 4 illustrates a communications system 400. FIG. 4 illustrates an LTE network where the eNB 410 is connected 420, 430 to MMEs 250a, 250b of PLMN A and PLMN B. These connections enable RAN sharing, as defined and discussed in 3GPP TS 23.251 V13.2.0. In this LTE network 400, wireless devices associated with one of the further wireless access networks that are camping on the first wireless access network may access their original core networks using RAN sharing.

Figures 5, 12:
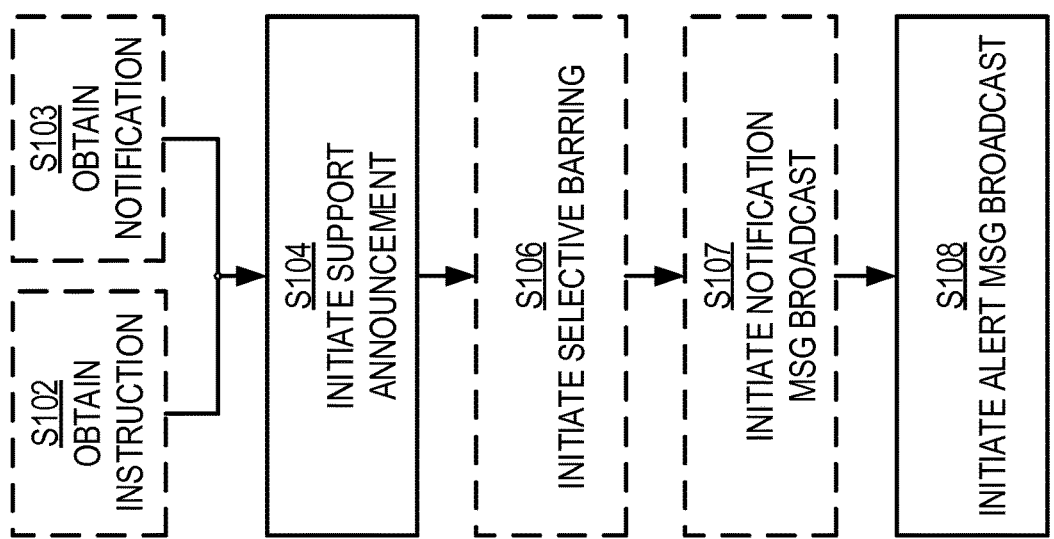
FIG. 5 is a flowchart of methods according to embodiments.
FIG. 12 illustrates a correspondence between a warning type value and a warning type.

FIG. 5 describes different aspects of the methods that have been discussed above in connection to the examples of FIGS. 1-4. In particular, FIG. 5 illustrates a method for a public information system 110, adapted for broadcasting a message 111 in a first wireless access network 130. The first wireless access network is arranged to, at least partly, overlap one or more further wireless access networks 120a, 120b. The method comprises initiating a modified support announcement S104 by the first wireless access network 130. The modified support announcement is configured to announce support for the further wireless access networks 120a, 120b by comprising network identifiers associated with the further wireless access networks, whereby a wireless device 140 associated with a further wireless access network 120a, 120b is prompted to connect to the first wireless access network 130. The method also comprises initiating broadcasting S108 of the message over the first wireless access network 130, whereby said wireless device 140 may receive the message over the first wireless access network.

The mechanisms of said modified support announcement have been discussed above in connection to FIGS. 1-4. Herein, 'initiating' is to be construed as any action leading to the execution of a modified support announcement or broadcasting as discussed above.

It is appreciated that the wireless device 140 does not necessarily know that it is connecting to a PS network different from the MNO PLMN, since the announced PLMN identifier is the same.

The disclosed method may be implemented in various types of wireless access networks, and may be used for different purposes, including public information and public warning, for instance;

According to aspects, the public information system comprises a public warning system, PWS, and the message comprises an alert message and/or a warning message.

According to aspects, the first wireless access network 130 is a public safety network, and a further wireless access network 120a, 120b is a commercial network separate from the public safety network.

According to aspects, the first wireless access network 130 is part of a Public Safety, PS, long term evolution, LTE, communication system.

According to aspects, one of the further wireless access networks 120a, 120b is a Public Land Mobile Network (PLMN), associated with a Mobile Network Operator (MNO).

It is appreciated that the modified support announcement may be broadcasted even though one or more of the further wireless networks are fully operational.

One way to start the process is to transmit an instruction to the public information system. According to aspects, the method further comprises obtaining an instruction S102 to initiate broadcast of the message to wireless devices 140 associated with one or more of the further wireless access networks 120a, 120b.

Said instruction may be received by the public warning interface from a controlling authority of the public information system.

According to aspects, the obtaining an instruction comprises obtaining network identifiers corresponding to the further wireless access networks 120a, 120b. Thus, having regard to the network identifiers of the further wireless access networks, the relevant modifications can be made in the modified support announcement to announce support also for the further wireless access networks in the modified support announcement broadcasted by the first wireless access network.

According to aspects, the obtaining an instruction comprises receiving the message to broadcast. This way, a command may be received by the public information system to broadcast a given message to wireless devices associated with the one or more further wireless access networks.

According to aspects, the obtaining an instruction comprises obtaining an instruction to broadcast the message to one or more wireless devices 140 associated with a pre-configured list of further wireless access networks 120a, 120b.

According to aspects, the method further comprises obtaining a notification S103 of a malfunction condition in one or more of the further wireless access networks 120a, 120b. This way, the public information system knows which further wireless access networks that are no longer capable of delivering broadcasted messages to associated wireless devices. The public information system may then announce support for such further wireless access networks in order to improve on the probability that important broadcast messages are received also by the wireless devices that are associated with malfunctioning networks.

According to aspects, the obtaining a notification comprises obtaining a list of network identifiers corresponding to the further wireless access networks 120a, 120b associated with malfunction condition.

According to aspects, the initiating a modified support announcement comprises initiating a modification of a System Information Block type 1, SIB1, of the first wireless access network to comprise a network identity list corresponding to the one or more further wireless access networks. The modification of a SIB1 was discussed above.

According to aspects, the initiating a modified support announcement comprises initiating activation of a network sharing function, or Radio Access Network, RAN, sharing function. RAN sharing function is defined and discussed in 3GPP text TS 23.251 V13.2.0.

According to aspects, the method further comprises initiating selective barring S106 of a wireless device 140 associated with a further wireless access network from accessing the first wireless access network 130. Selective barring is discussed in 3GPP texts TS 22.011 v14.3.0 and TS 36.331 v14.0.0 under the reference Extended Access Barring.

According to aspects, the first wireless access network has access to a list of identities of wireless devices which should be given access to the first wireless access network, i.e., not barred, while wireless devices not on the list are barred. For instance the list may be a list of International Mobile Equipment Identity numbers (IMEI) available to the PS-LTE and corresponding to select wireless devices. If such a wireless device is prompted to camp on the PS-LTE, they can be given access to the first wireless access network.

According to aspects, the selective barring comprises initiating a PLMN specific access class barring using SIB2 and/or SIB14. It is appreciated that both SIB2 and/or SIB14 can be used. SIB2 is used to bar "normal" UEs and wireless devices while SIB14 is used to bar "EAB capable", i.e., devices adapted for operating as Internet of Things, IoT, devices.

According to aspects, the selective barring comprises initiating a service class specific barring. This service class specific barring is, according to some aspects, configured to allow wireless devices camping on the first wireless access network to access a subset of communications services, while being barred from other communications services. In one exemplary embodiment, a selectively barred wireless device camping on the first wireless access network is allowed to place an emergency call via the first wireless access network, but is barred from calling other numbers. In one exemplary embodiment, a wireless device is allowed to access certain network resources, such as Internet web-pages associated with public service organizations, via the first wireless access network, while being barred from other Internet web-pages.

According to an exemplary embodiment, a wireless device under selective barring will receive a warning message on a web-page when requesting access to any web-page. For instance, if a selectively barred wireless device requests a webpage of a search tool, the wireless device will display the webpage with the warning message instead of the webpage of the search tool.

According to aspects, the method further comprises initiating broadcast of a notification message S107 comprising information about said modified support announcement to wireless devices 140 associated with the further wireless access networks 120a, 120b.

In one example embodiment a bit in the Warning-Type, TS 36.331 v14.0.0, TS 23.041 v13.2.0 (e.g. 10000000 to 1000100 from the "Reserved for future use" range) is set in order to indicate that a given message comes from a network where the UE is not allowed to attach. FIG. 12 illustrates correspondence between Warning typeValue and Warning type.

According to aspects, the initiating broadcasting comprises initiating transmission of a Public Warning Message, PWM, using any of SIB10, SIB11, and SIB12 to wireless devices 140 associated with the further wireless access networks 120a, 120b.

It is appreciated that these SIBs are alternatives. There are multiple PWS solutions for different markets, e.g., the Earthquake and Tsunami Warning System (ETWS), the Commercial Mobile Telephone Alerts system (CMAS), the Wireless Emergency Alerts system (WEA), and the Korean Public Alert System (KPAS), see, 3GPP TS 23.041, v14.0.0.

According to aspects, the initiating broadcasting comprises initiating broadcasting only when a further wireless access network is in a malfunction condition, or has reported a malfunction condition.

According to aspects, the initiating broadcasting is preceded by a pre-configured time delay, during which pre-configured time delay a wireless device 140 may connect to the first wireless access network 130.

According to aspects, the initiating broadcasting comprises selectively initiating broadcasting in a part of the first wireless access network, whereby the message is broadcasted in the part of the first wireless access network, and is not broadcasted in another part of the first wireless access network.

Thus, broadcasting can be limited to a certain geographical area where the broadcasted message is relevant. Thus, communications resources of the first wireless access network are conserved, and the relevance of messages to recipients in a given geographical area can be ensured.

According to aspects, the initiating a modified support announcement comprises initiating broadcasting of a modified support announcement selectively in a part of the first wireless access network, whereby the modified support announcement is broadcasted in the part of the first wireless access network, and is not broadcasted in another part of the first wireless access network.

Thus, modified support announcement is selectively transmitted to wireless devices located in a certain geographical area. This way only relevant wireless devices are prompted to connect to the first wireless access network, e.g., wireless devices that are in the geographical area to which the broadcasted message pertains.

Figure 6:
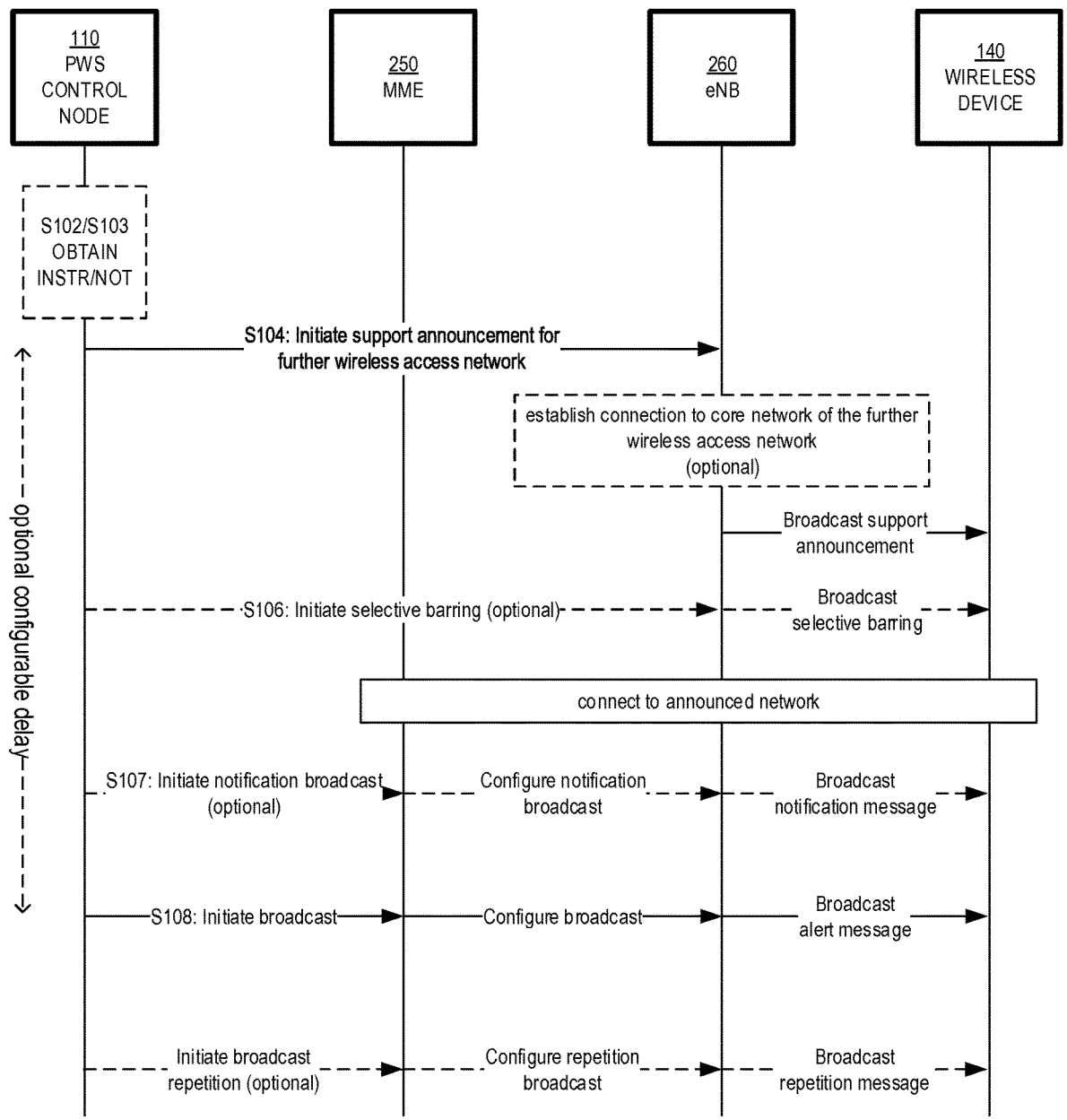
FIGS. 6, 7 are signalling diagrams illustrating events according to embodiments.

FIG. 6 is a signalling diagram illustrating interactions in a wireless communications system according to embodiments of the methods discussed in connection with FIG. 5 above. The method illustrated in FIG. 6 comprises interactions between a public warning system (PWS) control node 110, an MME 250, an eNodeB, or eNB 260, and a wireless device 140. The PWS optionally obtains an instruction or notification which prompts the PWS control node to initiate broadcast of a message to one or more wireless devices. This message can be an alert or warning message, or an information message of more general nature. The PWS control node initiates broadcasting of a modified support announcement, S104. The modified support announcement is configured to announce support for at least one further wireless access network. This initiation is performed by communicating with the eNB 260 using an O&M interface. This communication comprises, e.g., configuring the one or more additional PLMN identifiers for which support should be announced by the first wireless access network. The eNB 260 then optionally establishes a connection to a core network of the further wireless access network using the S1 setup procedure as defined in TS 36.413, v14.0.0, Sec. 8.7.3. Following configuration, the eNB then broadcasts the modified support announcement. Optionally, the PWS control node 110 also initiates selective barring, S106, of one or more wireless devices, as discussed above. This initiation is communicated to the eNB via en O&M interface, which eNB broadcasts the selective barring to the wireless device.

Wireless device 140 receives the broadcast of the modified support announcement from the eNB, an optionally also receives the selective barring broadcast. The broadcasted modified support announcement allows the wireless device to camp on the eNB 260.

The PWS control node, after an optional configurable or pre-configured delay, then initiates broadcast, S108. This initiation is performed by communicating with the MME, using the SBc interface, as specified in TS 23.041, v14.0.0 Sec. 9.1.3, which MME then configures the eNB for broadcasting the message 111. Thus, the communication and configuration comprises, e.g., configuring the message 111 to broadcast and other broadcasting parameters. Following configuration, the eNB broadcasts the message, which can be received by the wireless device due to camping on the cell, enabled via the modified support announcement.

Optionally, the PWS control node may initiate a notification broadcast S107. This initiation comprises communication with the MME 250 in order to configure a notification broadcast. Following the configuration, the eNB 260 broadcasts the notification message to the wireless device. The notification message may, e.g., comprise information about the modified support announcement, and thus notify the wireless device that it is now served by the first wireless access system and that it may experience a different level of service. For instance, the notification message may comprise information notifying that no outbound calls may be placed, but that waning and alert messages will be received. In one example embodiment, described above, the initiating notification broadcast is comprised in S108. The broadcast here includes a warning type and the warning type would have the most significant bit (MSB) set to 1 to inform about reduced or changed level of service.

Optionally, the PWS control node may initiate a broadcast repetition. This procedure follows the same steps as the original broadcast initiation. The purpose of the repetition broadcast can be, e.g., to improve on delivery probability of an important message to wireless devices.

Figure 7:
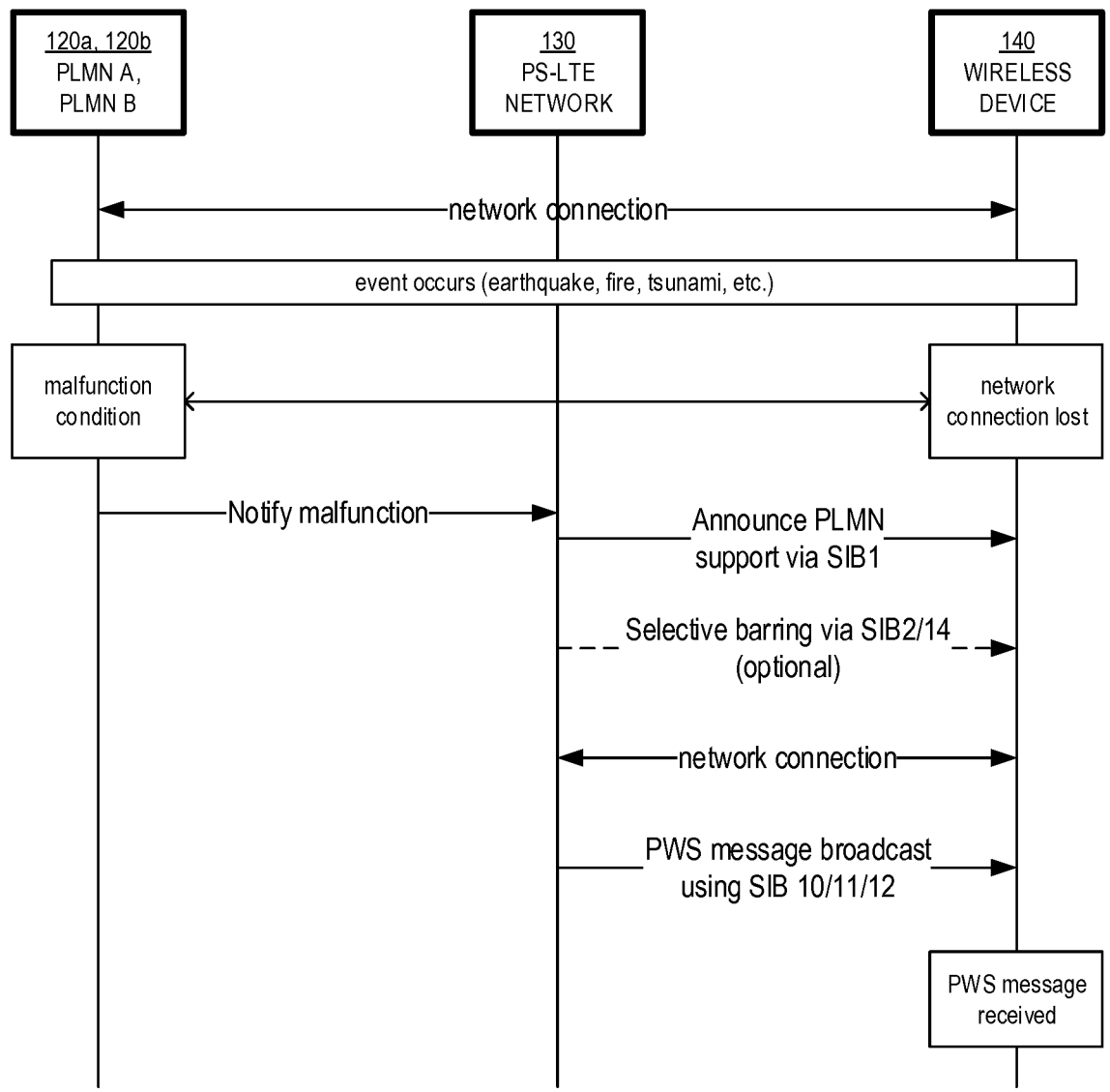

FIG. 7 is a signalling diagram illustrating an example sequence of events in a public information system according to embodiments. This example shows interactions between a PLMN of some MNO, 120a, 120b, a PS-LTE network 130, and a wireless device 140 associated with the MNO.

The wireless device is initially connected to the PLMN of the MNO 120a, 120b. Then some event occurs, e.g., an earthquake, a tsunami, or some other event which causes a loss of service and a malfunction condition at the MNO PLMN. Consequently, the wireless device loses its network connection due to the malfunction condition.

The MNO PLMN, or a control node comprised in the MNO PLMN, notifies the PS-LTE network 130, or a control node comprised in the PS-LTE network. The PS-LTE network then announces support for the PLMN via SIB1. The PS-LTE network also optionally broadcasts a selective barring message via SIB2 and/or SIB14.

It is appreciated that the malfunction notification may also come from an external control node separate from MNO PLMN.

The modified support announcement by the PS-LTE network enables the wireless device to camp on the PS-LTE network instead of the malfunctioning MNO PLMN. The PS-LTE network, or a PWS operatively connected to the PS-LTE network can now reach the wireless device 140 with broadcasts.

Thus, a PWS message broadcast may be transmitted to the wireless device 140 using SIB 10 or SIB 11 or SIB 12.

It is appreciated that the wireless device 140 does not necessarily know that it is connecting to a PS-LTE network different from the MNO PLMN, since the announced PLMN identifier is the same.

This procedure results in that a PWS warning message is received by the wireless device, regardless of the operating condition of the PLMN of the MNO to which the wireless device is associated normally.

FIG. 8 is a schematic diagram showing functional units of a control node 810 according to embodiments;

FIG. 8 schematically illustrates, in terms of a number of functional units, the components of a control node 810 according to embodiments. Processing circuitry 820 is provided using any combination of one or more of a suitable central processing unit (CPU), multiprocessor, microcontroller, digital signal processor (DSP), etc., capable of executing software instructions stored in a computer program product (as in FIG. 9), e.g. in the form of a storage medium 840. The processing circuitry 820 may further be provided as at least one application specific integrated circuit (ASIC), or field programmable gate array (FPGA).

Particularly, the processing circuitry 820 is configured to cause the control node 810 to perform a set of operations, or steps, S102-S108, as disclosed above in connection to FIG. 5. For example, the storage medium 840 may store the set of operations, and the processing circuitry 820 may be configured to retrieve the set of operations from the storage medium to cause the control node 810 to perform the set of operations. The set of operations may be provided as a set of executable instructions. Thus the processing circuitry is thereby arranged to execute methods as herein disclosed.

The storage medium 840 may also comprise persistent storage, which, for example, can be any single one or combination of magnetic memory, optical memory, solid state memory or even remotely mounted memory.

The control node 810 may further comprise a communications interface 830 for communications at least with the control node. As such the communications interface may comprise one or more transmitters and receivers, comprising analogue and digital components.

The processing circuitry 820 controls the general operation of the control node 810 e.g. by sending data and control signals to the communications interface 830 and the storage medium 840, by receiving data and reports from the communications interface 830, and by retrieving data and instructions from the storage medium 840. Other components, as well as the related functionality, of the control node 810 are omitted in order not to obscure the concepts presented herein.

In other words, FIG. 8 illustrates a public information system control node 810 arranged to control a public information system adapted for broadcasting a message in a first wireless access network 130, the first wireless access network arranged to, at least partly, overlap one or more further wireless access networks 120a, 120b, the control node comprising processing circuitry 820, the processing circuitry being configured to cause the control node to initiate a modified support announcement by the first wireless access network 130, the modified support announcement configured to announce support for the further wireless access networks 120a, 120b by comprising network identifiers associated with the further wireless access networks, whereby a wireless device 140 associated with a further wireless access network 120a, 120b is prompted to connect to the first wireless access network 130, and to initiate broadcasting of the message over the first wireless access network 130, whereby said wireless device 140 may receive the message over the first wireless access network.

According to aspects, the control node comprises a communications interface 830 connected to the processing circuitry and configured to obtain an instruction to initiate broadcast of the message to wireless devices associated with the one or more further wireless access networks.

According to aspects, the communications interface 830 is further configured to obtain a notification of a malfunction in one or more further wireless access networks.

FIG. 9 schematically illustrates one example of a computer program 910 and a computer program product 930 comprising computer readable means 920. On this computer readable means, a computer program can be stored, which computer program can cause processing circuitry and thereto operatively coupled entities and devices, such as a communications interface and a storage medium, to execute methods according to embodiments described herein. The computer program and/or computer program product may thus provide means for performing any steps of the methods disclosed herein.

In particular, the computer program and/or computer program product may thus provide means for performing a computer program 910 for a control node 810 arranged to control a public information system adapted for broadcasting a message in a first wireless access network 130. The first wireless access network is arranged to, at least partly, overlap one or more further wireless access networks 120a, 120b. The computer program comprising computer code which, when run on processing circuitry 820 of the control node 810, causes the control node to initiate a modified support announcement by the first wireless access network 130. The modified support announcement being configured to announce support for the further wireless access networks 120a, 120b by comprising network identifiers associated with the further wireless access networks, whereby a wireless device 140 associated with a further wireless access network 120a, 120b is prompted to connect to the first wireless access network 130, and to initiate broadcasting of the message over the first wireless access network 130, whereby said wireless device 140 may receive the message over the first wireless access network.

FIG. 10 schematically illustrates, in terms of a number of functional modules, the components of a control node according to an embodiment. The control node 1010 of FIG.

10 comprises a number of functional modules; an initiate modified support announcement module Sx104 configured to perform step S104, and an initiate broadcast module Sx108 configured to perform step S108.

With reference to the methods illustrated in FIG. 5, the control node 1010 of FIG. 10 may further comprise a number of optional functional modules, such as any of an obtain instruction module Sx102 configured to perform step S102, a further obtain notification module Sx103 configured to perform step S103, and an initiate selective barring module Sx106 configured to perform step S106.

In general terms, each functional module of FIG. 10 may be implemented in hardware or in software. Preferably, one or more or all functional modules may be implemented by the processing circuitry 820 of the control node 810, possibly in cooperation with functional units 830 and 840. The processing circuitry 820 may thus be arranged to, from the storage medium 840, fetch instructions as provided by a functional module and to execute these instructions, thereby performing any steps of the control node and methods as disclosed herein.

In general terms, each functional module may in one embodiment be implemented only in hardware or and in another embodiment with the help of software, i.e., the latter embodiment having computer program instructions stored on the storage medium which when run on the processing circuitry makes the control node perform the corresponding steps mentioned above. It should also be mentioned that even though the modules correspond to parts of a computer program, they do not need to be separate modules therein, but the way in which they are implemented in software is dependent on the programming language used. The control node 810 may be provided as a standalone device or as a part of at least one further device. For example, the control node may be hosted by, provided in, or installed on a node of a wireless access network or a core network.

FIG. 10 is a schematic diagram showing modules of a control node according to embodiments. In particular, there is illustrated a public information system control node 1010 arranged to control a public information system adapted for broadcasting a message in a first wireless access network 130. The first wireless access network is arranged to, at least partly, overlap one or more further wireless access networks 120a, 120b. The control node comprises a first module Sx104 configured to initiate a modified support announcement by the first wireless access network 130, the modified support announcement configured to announce support for the further wireless access networks 120a, 120b by comprising network identifiers associated with the further wireless access networks, whereby a wireless device 140 associated with a further wireless access network 120a, 120b is prompted to connect to the first wireless access network 130, and a second module Sx108 configured to initiate broadcasting of the message over the first wireless access network 130, whereby said wireless device 140 may receive the message over the first wireless access network.

According to aspects, the control node comprises a third module Sx102 configured to obtain an instruction to initiate broadcast of the message to wireless devices associated with the one or more further wireless access networks.

According to aspects, the control node comprises a fourth module Sx103 configured to obtain a notification of a malfunction in one or more further wireless access networks.

According to aspects, the control node comprises a fifth module Sx106 configured to selectively bar a wireless device associated with a further wireless access network from accessing the first wireless access network 130.

The invention claimed is:

1. A method for a public information system, adapted for broadcasting a message in a first wireless access network that is a public safety network, the first wireless access network arranged to, at least partly, overlap one or more further wireless access networks that is a commercial network being separated from the public safety network, the method being performed in a public information system control node comprises;
   obtaining a notification of a malfunction condition in the one or more of the further wireless access networks, where the obtaining the notification comprises obtaining a list of network identifiers corresponding to the further wireless access networks associated with malfunction condition;
   initiating a modified support announcement by the first wireless access network, the modified support announcement configured to announce support for the further wireless access networks by comprising the network identifiers associated with the further wireless access networks, whereby a wireless device associated with the further wireless access network is prompted to connect to the first wireless access network, and
   initiating broadcasting of the message over the first wireless access network, whereby said wireless device may receive the message over the first wireless access network;
   initiating selective barring of the wireless device associated with the further wireless access network from accessing the first wireless access network.

2. The method according to claim 1, wherein the public information system comprises a public warning system, PWS, and wherein the message comprises an alert message and/or a warning message.

3. The method according to claim 1, wherein the first wireless access network is part of a Public Safety, PS, long term evolution, LTE, communication system.

4. The method according to claim 1, wherein one of the further wireless access networks is a Public Land Mobile Network, PLMN, associated with a Mobile Network Operator, MNO.

5. The method according to claim 1, further comprising obtaining an instruction to initiate broadcast of the message to wireless devices associated with one or more of the further wireless access networks.

6. The method according to claim 5, wherein the obtaining the instruction comprises obtaining network identifiers corresponding to the further wireless access networks.

7. The method according to claim 5, wherein the obtaining the instruction comprises receiving the message to broadcast.

8. The method according to claim 5, wherein the obtaining the instruction comprises obtaining an instruction to broadcast the message to one or more wireless devices associated with a pre-configured list of further wireless access networks.

9. The method according to claim 1, wherein the initiating a modified support announcement comprises initiating a modification of a System Information Block type 1, SIB1, of the first wireless access network to comprise a network identity list corresponding to the one or more further wireless access networks.

10. The method according to claim 1, wherein a network identity comprises a PLMN identity, PLMN ID, or a service set identifier, SSID.

11. The method according to claim 1, wherein the initiating a modified support announcement comprises initiating activation of a network sharing function, or Radio Access Network, RAN, sharing function.

12. The method according to claim 1, wherein the selective barring comprises initiating a PLMN specific access class barring using SIB2 and/or SIB14.

13. The method according to claim 1, further comprising initiating broadcast of a notification message comprising information about said modified support announcement to wireless devices associated with the further wireless access networks.

14. The method according to claim 1, wherein the initiating broadcasting comprises initiating transmission of a Public Warning Message, PWM, using any of SIB10, SIB11, and SIB12 to wireless devices associated with the further wireless access networks.

15. The method according to claim 1, wherein the initiating broadcasting comprises initiating broadcasting only when the further wireless access network is in, or has reported, the malfunction condition.

16. The method according to claim 1, wherein the initiating broadcasting is preceded by a pre-configured time delay, during which pre-configured time delay the wireless device may connect to the first wireless access network.

17. The method according to claim 1, wherein the initiating broadcasting comprises selectively initiating broadcasting in a part of the first wireless access network, whereby the message is broadcasted in the part of the first wireless access network, and is not broadcasted in another part of the first wireless access network.

18. The method according to claim 1, wherein the initiating a modified support announcement comprises initiating broadcasting of a modified support announcement selectively in a part of the first wireless access network, whereby the modified support announcement is broadcasted in the part of the first wireless access network, and is not broadcasted in another part of the first wireless access network.

19. A public information system control node arranged to control a public information system adapted for broadcasting a message in a first wireless access network that is a public safety network, the first wireless access network arranged to, at least partly, overlap one or more further wireless access networks that is a commercial network being separated from the public safety network, the control node comprising processing circuitry, the processing circuitry being configured to cause the control node to:
  obtain a notification of a malfunction condition in the one or more of the further wireless access networks, where the obtaining the notification comprises obtaining a list of network identifiers corresponding to the further wireless access networks associated with malfunction condition;
  initiate a modified support announcement by the first wireless access network, the modified support announcement configured to announce support for the further wireless access networks by comprising network identifiers associated with the further wireless access networks, whereby a wireless device associated with the further wireless access network is prompted to connect to the first wireless access network, and to
  initiate broadcasting of the message over the first wireless access network, whereby said wireless device may receive the message over the first wireless access network;
  initiate selective barring of a wireless device associated with the further wireless access network from accessing the first wireless access network.

20. The control node according to claim 19, comprising a communications interface connected to the processing circuitry and configured to obtain an instruction to initiate broadcast of the message to wireless devices associated with the one or more further wireless access networks.

* * * * *